Feb. 7, 1961 P. H. P. BARRY 2,970,580
RADIATED REFRIGERATION ENGINE COOLING
Filed July 10, 1959 2 Sheets-Sheet 1
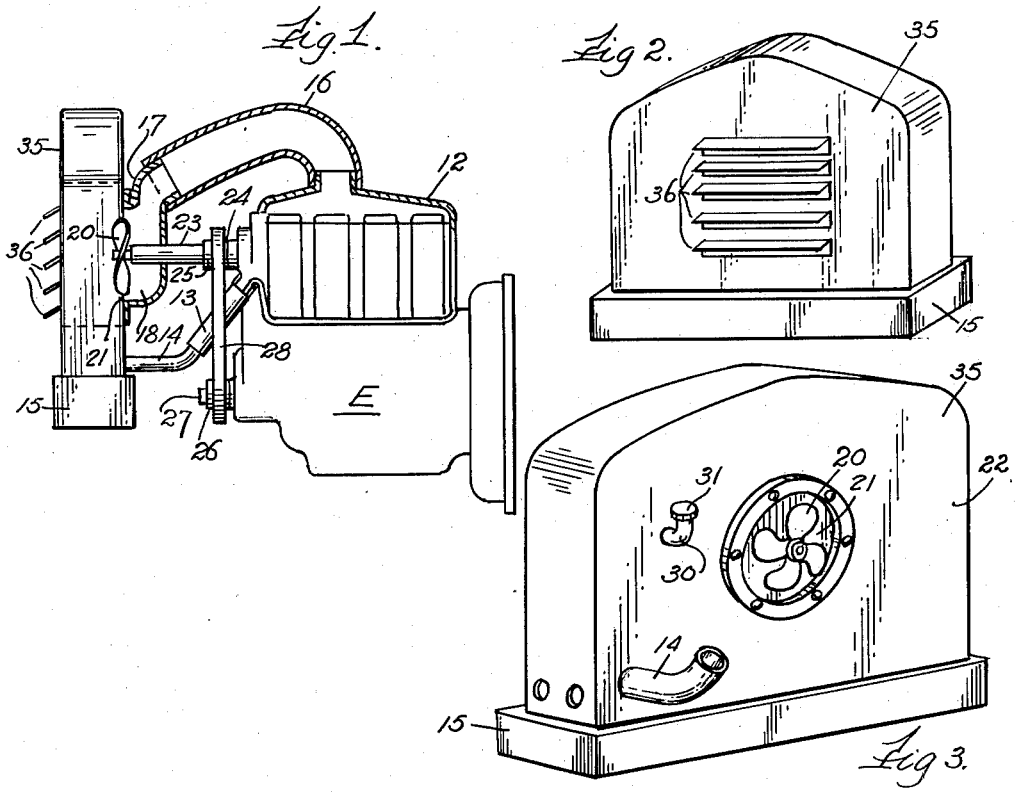
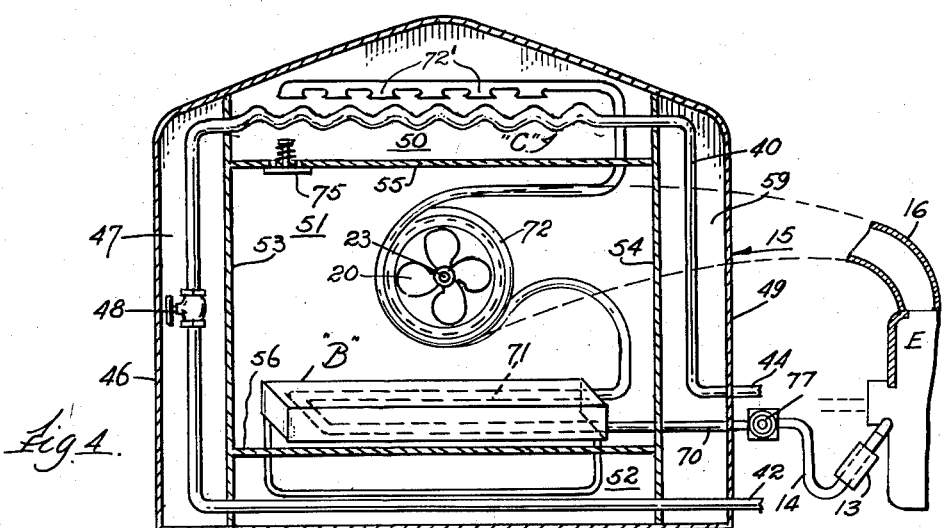
INVENTOR.
Patrick H.P. Barry.
BY Joseph B. Lindecker.
Attorney.

United States Patent Office

2,970,580
RADIATED REFRIGERATION ENGINE COOLING
Patrick H. P. Barry, 219 St. Benedicts Road, Small Heath, Birmingham, England Filed July 10, 1959, Ser. No. 826,355

8 Claims. (Cl. 123—41.19)

This invention relates to engines and more particularly to cooling systems therefor.

It is an object of the present invention to provide an extremely efficient cooling system for internal combustion engines, and more particularly to internal combustion engines of automotive vehicles.

Another object of the present invention is to provide a cooling system for maintaining internal combustion engines at a proper operating temperature, in which a coolant is circulated through the heat transfer device for extracting heat from the air circulated through the engine as the cooling agent.

Still an additional object of the present invention is to provide an internal combustion engine cooling system of the above type in which air is used solely as the heat transfer fluid for extracting heat from the engine, such air being passed over refrigerating coils for extracting and disposing of the heat carried thereby.

Still another object of the present invention is to provide a cooling system for maintaining internal combustion engines at a proper temperature, in which the air circulated through the engine travels through pipes which are coiled within a brine tank which is extremely cold, the air pipe terminating into a nozzle with a plurality of air jets where the air is free to travel over a condenser with air baffles and further cooled, after which it can return to the engine to again cool the same.

It is desirable that this invention has reference to cooling means for explosion type engines, and especially for engines of automobiles, and its object is to obviate the necessity of employing water as a cooling agent and to avoid the necessity of a tubular water type radiator such as is usually provided at the front of the hood of an automobile.

In accordance with the present invention air is employed as the cooling agent and the air is kept in circulation through the engine jacket by a suitable fan driven by the automobile engine. The air is blown continuously through the engine jacket, then through pipes which, through a portion of its course, transverses a refrigerating chamber, the brine tank forming a part of the refrigerating system of small size. Since the refrigeration system may be of the ammonia type, an ammonia pump is included in the refrigeration circuit, which pump may receive its power from the automobile engine, or any suitable means. Since ammonia and brine are the only liquids employed and neither freezes under such temperatures as the automobile is liable to encounter even in the severest winter weather, there is nothing about the cooling system to freeze so as to either stop its circulation or injure the parts.

Furthermore, since the circulating cooling medium for the engine is air, there is no liability of the circulating system running dry and so failing to act, as the housing is equipped with suitable vents to supply any additional air required.

Other objects of the invention are to provide an internal combustion engine cooling system bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevation view, with parts in section, showing somewhat diagrammatically the arrangement of the air conditioning unit, or refrigeration radiator, assembled with the internal combustion engine of an automobile;

Figure 2 is a front perspective view of the refrigeration radiator, showing air vents on the front panel thereof;

Figure 3 is a rear perspective view of the refrigeration radiator shown by Figure 2, showing the air fan in a portion of the air tunnel;

Figure 4 is a vertical sectional view, shown somewhat diagrammatically, of the refrigeration radiator, showing the air pipes passing through the secondary refrigerant tank, commonly called a brine tank.

Figure 5:
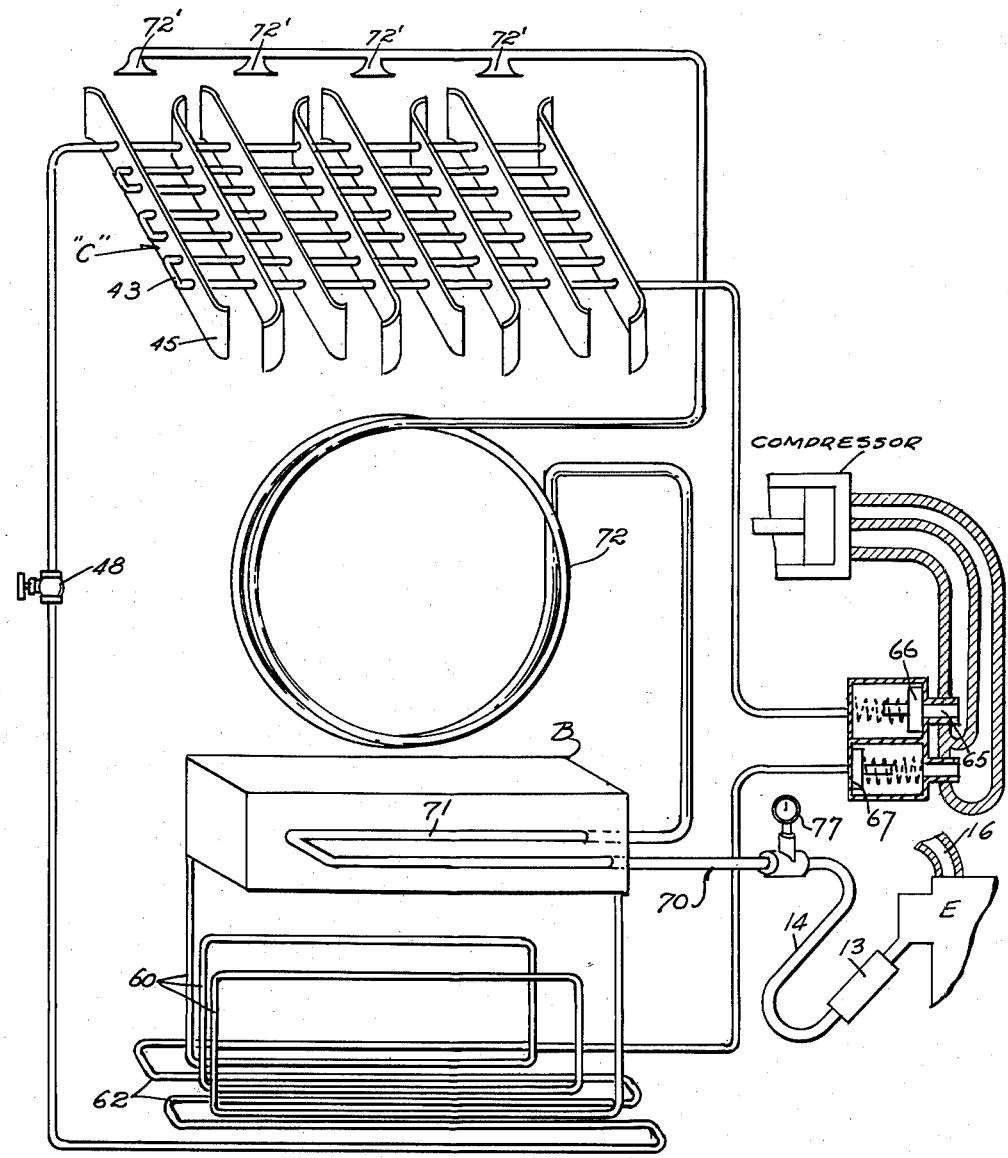
Figure 5 is a diagrammatic representation with some parts shown in section, and some parts in perspective, of a refrigeration system embodying the present invention.

Referring to the drawings, there is shown a diagrammatic representation of a multi-cylinder internal combustion engine E such as is customarily employed with an automobile. The engine is provided with the usual cooling medium jacket 12, but in the present case the jacket is employed for the circulation of air about the cylinders of the engine instead of some liquid medium.

Leading from the lower portion of the front end of the engine and connected with the jacket 12, is a pipe, or hose 13 which may extend to a pipe 14 extending outwardly from the rear of the refrigeration radiator housing 15.

Leading from the top of the engine and connected with the jacket 12, is a pipe, or hose 16 which may extend to and be clamped to a pipe elbow 17 arranged in the top portion of the air tunnel 18, assembled upon the rear panel of housing 15, and secured thereto by a plurality of bolts, clearly shown by Figures 1 and 3.

An air fan 20 is assembled in the opening 21 in the rear panel 22 of the housing 15, said fan being vertically mounted upon a shaft 23 rotatably and horizontally assembled in a suitable bearing assembled in bearing housing 24, a first pulley 25 is assembled vertically upon said shaft 23 adjacent the bearing housing 24. A second pulley 26 is mounted upon a shaft 27 extending forwardly from the lower front end of the engine and in line with the crankshaft therein; said shaft 26 being in vertical alignment with pulley 25 and connected therewith by a belt 28. By the above described assembly of parts the fan 20 is driven by the engine to force cool air from the refrigeration radiator through the jacket 12 of the engine E. An elbow 30 extends outwardly, with a removable cap 31 thereon, from the panel 22, forming a filling means to replace liquid in the brine tank "B" later to be described. The housing 15 is shown by Figures 1 and 2 to have a front panel 35 with five longitudinally arranged louvres or air vents 36 pivotally assembled therewith.

Reference now more in detail to the drawing, and more particularly to Figures 4 and 5, the cooling unit is shown to include the main housing 15 having a primary refrigerant pipe 40, or duct, encircling the periphery thereof, which duct provides for circulation of a coolant therethrough from the inlet 42 to the outlet 44 thereof.

The interior of the housing 15 is provided with three chambers 50, 51 and 52 formed by vertical walls 53 and 54 and horizontal walls 55 and 56. As viewed and shown by Fig. 4, the left outer wall 46 is shown forming a vertical elongated chamber 47 through which duct 40 extends, a control valve 48 is assembled in the vertical duct 40 within chamber 47. The right wall 49 forms a vertical elongated chamber 59 through which the return section of duct 40 extends. The duct 40 has assembled therewith in upper chamber 50, a condenser "C" with air baffles 45. A brine supply tank "B" is horizontally arranged in the lower section of chamber 51, the filling pipe 30 connected with the tank "B" is shown by Fig. 3. A plurality of brine piping coils 60, shown by Fig. 5, are arranged in the lower chamber 52 with inlet and outlet pipes extending through wall 56 to the tank "B." The primary refrigeration line 42 is assembled with coils 62 in chamber 52, the coils 62 in turn cools the brine in coils 60 which in turn cools the air in pipes passing through the tank and which is circulated through the engine jacket 12 and again returned to the unit housing 15. If it is so desired, the primary inlet pipe 42 could pass directly through the brine tank "B," thereby eliminating the brine coils 60 and the primary cooling coils 62 arranged adjacent thereto in chamber 52.

The primary duct 40 further cools the interior of housing 15, including chambers 47, 50, 51, 52 and 59, as will be obvious to those skilled in the art. The primary coolant is pumped through the duct 40 by compressor 65, shown by Fig. 5, with spring operated delivery valve 66 and suction valve 67. The lower chamber 52 may be referred to as the refrigerating chamber, chamber 51 may be referred to as the cooling chamber and chamber 50 the condenser compartment.

The condenser "C" in the condenser compartment 50 consists of a plurality of coils 43 with vertically arranged transverse air baffles 45. The air returned from the engine passes through suitable piping 70, circulated through coil 71 in the brine tank "B," then through coils 72 of enlarged size in the chamber 51, the cooling chamber, sometimes referred to as the air cooling chamber. The piping of the circulated air is continued through the air cooling chamber to the condenser chamber. The air, now having been reduced in temperature, is now by means of air jets 72' played or sprayed on the coils 43 and baffles 45. The air baffles to assist the air cooling process of condenser "C." A pressure release valve 75 admits the air from condenser compartment 50 into the air cooling chamber 51 where it passes over the coils 72 and then recirculated by the fan 20 through the tunnel 18 to the jacket 12 about the engine E.

The air vents 36 assembled upon the front panel of housing 15 admits air into the air cooling chamber 51, not the entire housing 15. The air vents are valve controlled. A temperature gage 77 in the line 70 can be associated with the control valve connected with the air vents. This would prevent any loss of the refrigerant air before circulation to the cooling jacket. The air vents allowed necessary air to be added and also control the temperature of the air before it returns to the engine. The refrigerant recommended for use with the described method of cooling embraced by this invention may be carbon dioxide $CO_2$, or any other safe and suitable refrigerant.

As above described, the return engine cooling air, having accomplished the work of cooling the engine, is now increased in temperature. By means of extended piping the warm air is circulated through the brine tank. The absorption of the heat by the brine is utilized to produce the cold necessary to cool the air. The piping of the circulated air is continued through the cold air chamber and to the condenser compartment. Having now been reduced in temperature the circulated air is allowed to escape through jets and be sprayed on the condenser coils, then back into the air cooling chamber and to the fan and air tunnel for recirculation with the engine.

This embodiment of the present invention has the advantage that no liquid is circulated through the engine, thus obviating the need for anti-freeze in cold weather, avoiding inconvenience of leaks, and avoiding the necessity of having to keep liquid at a certain level within the cooling system.

As many embodiments may be made of this inventive concept, and as many modifications may be made in the embodiments hereinbefore shown and described, it will be understood that all matter herein is to be interpreted merely as illustrative and not in a limiting sense.

It will be further understood that modifications and variations may be effected without departing from the scope of the novel concept of the present invention.

What I claim as new and desire to protect by Letters Patent of the United States is:

1. A cooling system for internal combustion engines, comprising a refrigerator housing, an internal combustion engine embodying an internal air chamber and an external wall jacket associated therewith, a refrigeration chamber in said housing, a cooling chamber in said housing, air cooling means in said cooling chamber, refrigerating means connected with said refrigerating chamber, an air circulating duct connected at one end with said wall jacket forming a part of said internal combustion engine and at its opposite end with an inlet means associated with said cooling chamber forming a part of said housing, whereby air heated by radiation from said engine is directed through said air circulating duct to said air cooling means in said cooling chamber within said housing, a second air circulating duct connected at one end with an exit means associated with said cooling chamber and at its opposite end with an entrance means connected with said wall jacket, whereby air cooled by said cooling means in said cooling chamber is directed through said second air circulating duct to said engine.

2. The combination according to claim 1, wherein said air cooling means in said cooling chamber in said housing comprises a brine tank with liquid brine therein, said brine tank having liquid brine conduit coils connected therewith and extending into and out of said refrigeration chamber, whereby said liquid brine in said brine coils is cooled.

3. The combination according to claim 2, wherein said air heated by said engine is directed through pipes extending into, through and out of said brine tank in said cooling chamber, whereby the heated air inside said pipes is cooled by the liquid brine adjacent said pipes and in said brine tank.

4. A cooling system for internal combustion engines, comprising a refrigerator housing, an internal combustion engine embodying an internal air chamber and an external wall jacket associated therewith, said refrigerator housing having a refrigerating chamber, a cooling chamber, and a condenser compartment therein, a condenser in said condenser compartment, a plurality of air jets in said condenser compartment, a primary refrigerant pipe extending through said refrigerating chamber and encirculating the internal periphery of said housing and connected with said condenser in said condenser compartment, a brine tank with liquid brine therein arranged within said cooling chamber, brine piping coils connected with said brine tank and extending into, through and out of said refrigeration chamber, whereby said liquid brine is cooled, an air pipe extending into said cooling chamber and through said brine tank therein and extending into said condenser compartment and connected with said air jets in said condenser compartment, pressure air valve means connecting said condenser compartment with said cooling chamber for admitting air from said condenser compartment into said cooling chamber, an exit tunnel connected with said cooling chamber, a hose means connecting said tunnel with an inlet in said wall jacket, a second hose means connecting said air pipe extending into said cooling chamber with an outlet means in said wall jacket, whereby air heated by radiation from the engine is directed through said refrigeration housing and cooled therein before being directed again to said internal combustion engine for cooling the same.

5. The combination according to claim 4, wherein said refrigerator housing embodies two horizontal walls dividing said housing into three sections one above the other, forming an upper section, a lower section and an intermediate section, said upper section forming said condenser compartment, said lower section forming said refrigeration chamber, and said intermediate section forming said cooling chamber.

6. The combination according to claim 4, wherein said coolant comprises a refrigerant, and a refrigerating mechanism driven by the internal combustion engine for extracting heat from said refrigerant.

7. The combination according to claim 6, wherein said housing includes a front side having air vents, said air vents receiving circulated air inwardly therethrough for adding air to replenish desired air.

8. The combination according to claim 6, wherein said heat transfer fluid comprises air, and said heat transfer fluid conduits comprise nozzles directing said air over condenser coils connected with the coolant duct means for extracting heat therefrom.

References Cited in the file of this patent
UNITED STATES PATENTS 1,190,771    Keough _____ July 16, 1916